(12) United States Patent
Yu

(10) Patent No.: US 6,925,510 B2
(45) Date of Patent: Aug. 2, 2005

(54) PERIPHERAL OR MEMORY DEVICE HAVING A COMBINED ISA BUS AND LPC BUS

(75) Inventor: Kuo-Hwa Yu, Hsinchu (TW)

(73) Assignee: Winbond Electronics, Corp., Taiwan (CN)

( * ) Notice: Subject to any disclaimer, the term of this patent is extended or adjusted under 35 U.S.C. 154(b) by 160 days.

(21) Appl. No.: 10/081,249

(22) Filed: Feb. 22, 2002

(65) Prior Publication Data

US 2003/0163615 A1 Aug. 28, 2003

(51) Int. Cl.$^7$ .............................................. G06F 13/00
(52) U.S. Cl. ............................ 710/62; 710/16; 710/15; 710/305
(58) Field of Search .............................. 710/8, 11, 305, 710/313, 104, 306, 316, 14–16, 62–66, 315

(56) References Cited

U.S. PATENT DOCUMENTS

| | | | | |
|---|---|---|---|---|
| 5,596,562 A | * | 1/1997 | Chen | 710/315 |
| 5,671,355 A | * | 9/1997 | Collins | 709/250 |
| 5,832,244 A | * | 11/1998 | Jolley et al. | 710/305 |
| 5,991,841 A | | 11/1999 | Gafken et al. | |
| 6,131,127 A | | 10/2000 | Gafken et al. | |
| 6,170,027 B1 | * | 1/2001 | Lu et al. | 710/65 |
| 6,286,097 B1 | * | 9/2001 | Chang et al. | 713/2 |

* cited by examiner

*Primary Examiner*—Ilwoo Park
(74) *Attorney, Agent, or Firm*—Raymond Sun

(57) ABSTRACT

A peripheral or memory device has a bus, a first bus decoder circuit coupled to the bus for decoding a first type of bus signal, and a second bus decoder circuit coupled to the bus for decoding a second type of bus signal. The device also includes a circuit for detecting whether the bus is a first type of bus or a second type of bus, and outputting a select or detect signal to a switch. The switch is coupled to the first bus decoder circuit for providing a first bus enable signal thereto, and the switch is coupled to the second bus decoder circuit for providing a second bus enable signal thereto, depending on the nature of the select or detect signal.

2 Claims, 3 Drawing Sheets

PERIPHERAL OR MEMORY DEVICE HAVING A COMBINED ISA BUS AND LPC BUS

BACKGROUND OF THE INVENTION

1. Field of the Invention

The present invention relates generally to computer systems, and in particular, to peripheral and memory devices which can communicate with a computer system's chip-set by switching between an Industry Standard Architecture (ISA) bus and a Low Pin Count (LPC) bus.

2. Background Art

Conventional legacy-based computer systems include a variety of peripheral and memory devices that communicate with the system's chip-set or processor via an Industry Standard Architecture (ISA) bus or an Expansion bus (X-bus). The system chip-set must include a large amount of pins (e.g., approximately 50–70 pins) and associated circuitry to support the ISA bus or X-bus signals that are used to interface the chip-set or processor with legacy-based peripheral devices, including input/output (I/O) or I/O controller devices such as parallel port controllers, serial port controllers, super I/O controllers, floppy disk controllers, keyboard controllers, and memory devices such as non-volatile memory devices that store, for example, basic input-output services (BIOS) information.

The large number of pins needed to support the ISA bus and X-bus standards generally increases overall system cost. As a result, U.S. Pat. No. 6,131,127 to Gafken et al. discloses a Low Pin Count (LPC) bus that is capable of replacing the ISA bus or X-bus in a computer system. The LPC bus would be capable of supporting the same type of peripheral and memory devices, but utilizes a relatively smaller number of pins or signal lines (e.g., approximately 6–8 signal lines). The LPC bus provides a communication mechanism between a host (such as a processor or chip-set) and peripheral devices (such as I/O or I/O controller devices) or memory devices. The signal lines on the LPC bus are capable of carrying time-multiplexed address, data and control information to implement memory, I/O, direct memory access (DMA), and master bus transactions between the host and the peripheral or memory devices.

With the advent of the LPC bus, there is now available a new standard for communications between a host and a peripheral device. Since peripheral devices are often manufactured by different companies without knowing the intended bus on which the peripheral or memory device will be used, there still remains a need for peripheral and memory devices that are capable of being used with either the ISA bus or the LPC bus.

SUMMARY OF THE INVENTION

It is an object of the present invention to provide peripheral and memory devices that are capable of being used with either the ISA bus or the LPC bus.

It is another object of the present invention to provide peripheral and memory devices that can switch their communication with the host between the ISA bus and the LPC bus.

For purposes of the following description, the word "peripheral device" shall be used in a generic sense, and is intended to include conventional peripheral devices (such as but not limited to scanners, printers, etc.) and memory devices.

To accomplish the objectives of the present invention, there is provided a peripheral or memory device that has a bus, a first bus decoder circuit coupled to the bus for decoding a first type of bus signal, and a second bus decoder circuit coupled to the bus for decoding a second type of bus signal. The device also includes a circuit for detecting whether the bus is a first type of bus or a second type of bus, and outputting a select or detect signal to a switch. The switch is coupled to the first bus decoder circuit for providing a first bus enable signal thereto, and the switch is coupled to the second bus decoder circuit for providing a second bus enable signal thereto, depending on the nature of the select or detect signal.

In one embodiment of the present invention, the detecting circuit can be a micro-controller. According to another embodiment of the present invention, the detecting circuit can include a pin. According to yet another embodiment of the present invention, the detecting circuit can include a first bus snoop circuit coupled to the bus and a second bus snoop circuit coupled to the bus, with the switch coupled to the first bus snoop circuit for receiving a first bus detect signal therefrom, and the switch coupled to the second bus snoop circuit for receiving a second bus detect signal therefrom.

BRIEF DESCRIPTION OF THE DRAWINGS

The invention can be more fully understood by reading the subsequent detailed description of the preferred embodiments, with reference made to the accompanying drawings.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In certain instances, detailed descriptions of well-known or conventional data processing techniques, hardware devices and circuits are omitted so as to not obscure the description of the present invention with unnecessary detail.

The present invention provides peripheral and memory devices that are capable of being used with either the ISA bus or the LPC bus, and in particular, peripheral and memory devices that can switch their communication with the host between the ISA bus and the LPC bus.

Figure 1:
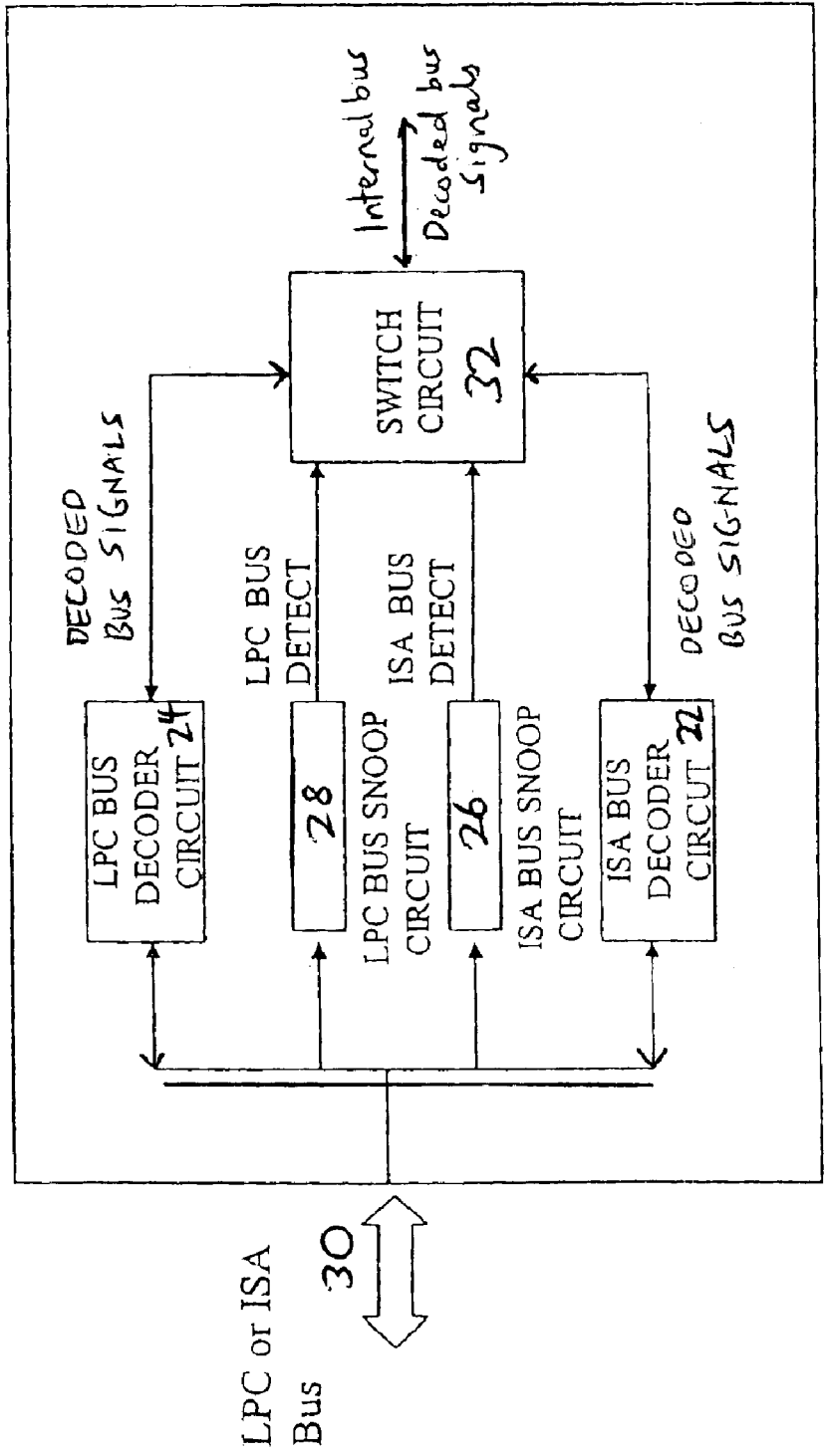
FIG. 1 is a very general schematic block diagram of a peripheral or memory device according to one embodiment of the present invention.

A first non-limiting embodiment of the present invention is illustrated in FIG. 1. FIG. 1 provides a high level schematic diagram that illustrates the primary hardware and software components of an automatic switching circuit that is provided in a peripheral device 20. The automatic switching circuit operates upon start up of the computer system to detect the type of bus (i.e., ISA or LPC), and to automatically switch communication with the host to the correct bus. The other components of a conventional peripheral device or memory device are not shown in FIG. 1, since they are well-known to those skilled in the art.

The automatic switching circuit in FIG. 1 has an ISA bus decoder circuit 22, an LPC bus decoder circuit 24, an ISA bus snoop circuit 26, and an LPC bus snoop circuit 28, all of which have inputs coupled to the bus 30. The outputs of the ISA bus decoder circuit 22 and the LPC bus decoder circuit 24 are also coupled to the bus 30. The bus 30 can be either an LPC bus or an ISA bus. The ISA bus decoder circuit 22 functions to decode the ISA bus signal, and the LPC bus decoder circuit 24 functions to decode the LPC bus signal. The ISA bus snoop circuit 26 functions to detect whether the signal from the bus 30 is an ISA bus signal, and the LPC bus snoop circuit 28 functions to detect whether the signal from the bus 30 is an LPC bus signal. The outputs of the ISA bus snoop circuit 26 and the LPC bus snoop circuit 28 are coupled to a switch circuit 32, which has inputs and outputs coupled to the ISA bus decoder circuit 22 and the LPC bus decoder circuit 24. The switch circuit 32 functions to switch between one of the ISA bus decoder circuit 22 and the LPC bus decoder circuit 24.

Each of the ISA bus decoder circuit 22 and the LPC bus decoder circuit 24 can be embodied in the form of a conventional decoder circuit that is well-known in the art. In addition, the switch circuit 32 can also be embodied in the form of any conventional switching circuit that receives a "detect" signal and based thereon enables either the ISA bus decoder circuit 22 or the LPC bus decoder circuit 24 (i.e., connects either circuit 22 or 24 to the bus 30). As a non-limiting example, the switch circuit 32 can be a de-multiplexor.

Each of the snoop circuits 26 and 28 perform the function of snooping or detecting the nature of the transaction (i.e., LPC or ISA) on the bus 30. In one non-limiting embodiment of the present invention, the snoop circuits 26 and 28 can perform this function by using a proper series of input/output (I/O) writes through the bus 30. For example, if the host initializes the proper series of I/O writes through an ISA bus, the ISA bus snoop circuit 26 will recognize these I/O writes, but the LPC bus snoop circuit 28 will not recognize these I/O writes. Similarly, if the host initializes the proper series of I/O writes through an LPC bus, the LPC bus snoop circuit 28 will recognize these I/O writes, but the ISA bus snoop circuit 26 will not recognize these I/O writes. Both snoop circuits 26, 28 have similar state machines for detecting the proper series of I/O writes but each has a different bus decoder for different bus protocols. Both snoop circuits 26, 28 operate on a "slave" basis, in that each circuit 26 and 28 waits (instead of polling) for signals from the bus 30.

In operation, when the computer system that includes the device 20 starts up, the system (which can be the processor of the peripheral or memory device) can initialize the device 20 by a "Plug and Play" procedure (as well-known in the art) or by using an initialization code. The "Plug and Play" procedure and the initialization code are normally provided by software or the BIOS. When the ISA bus snoop circuit 26 and the LPC bus snoop circuit 28 detect the proper series of I/O writes and the "Plug and Play" or initialization code, the appropriate snoop circuit 26 or 28 will provide a signal to the switch circuit 32 which indicates the status of the bus 30. For example, if the ISA bus snoop circuit 26 detects that the bus 30 is functioning as an ISA bus, then the ISA bus snoop circuit 26 provides an ISA bus detect signal to the switch circuit 32. Similarly, if the LPC bus snoop circuit 28 detects that the bus 30 is functioning as an LPC bus, then the LPC bus snoop circuit 28 provides a LPC bus detect signal to the switch circuit 32. The switch circuit 32 then enables either the ISA bus decoder circuit 22 or the LPC bus decoder circuit 24 depending whether a signal is received from the ISA bus snoop circuit 26 or the LPC bus snoop circuit 28, by providing an ISA bus enable signal to the ISA bus decoder circuit 22, or an LPC bus enable signal to the LPC bus decoder circuit 24. The enabled decoder circuit 22 or 24 will then decode the communication signals from the bus 30 using normal and well-known decoding methods for LPC and ISA communications, and provide the decoded signals via the switch circuit 32 to the other components of the peripheral device 20 for normal use and processing.

Figure 2:
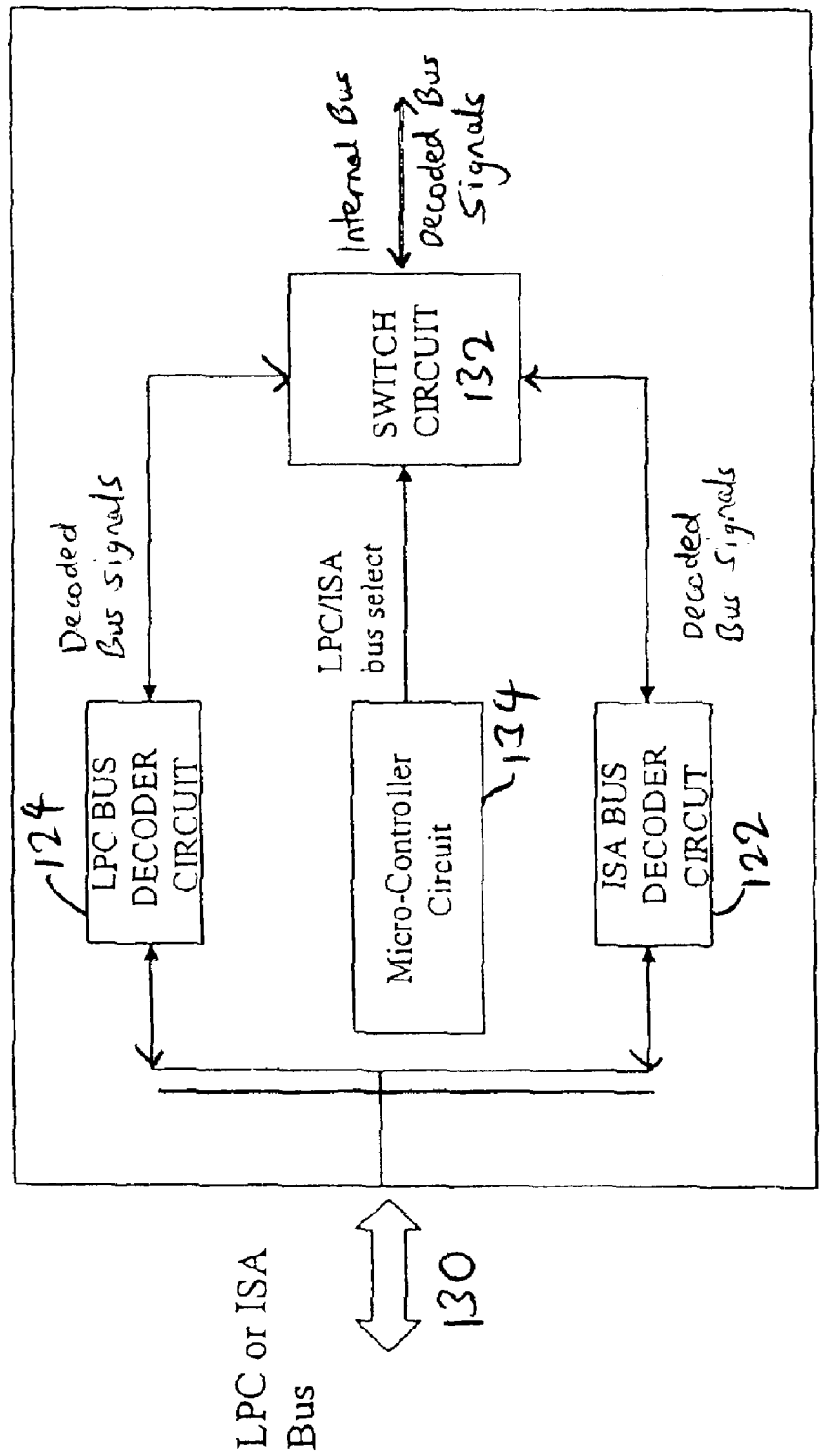
FIG. 2 is a very general schematic block diagram of a peripheral or memory device according to another embodiment of the present invention.

A second non-limiting embodiment of the present invention is illustrated in FIG. 2. FIG. 2 provides a high level schematic diagram that illustrates the primary hardware and software components of a micro-controller based switching circuit that is provided in a peripheral device 120. The micro-controller based switching circuit operates upon start up of the computer system by using the micro-controller of the device 120 to switch communication with the host to the correct bus. The other components of a conventional peripheral device or memory device are not shown in FIG. 2, since they are well-known to those skilled in the art.

The micro-controller based switching circuit in FIG. 2 has an ISA bus decoder circuit 122 and an LPC bus decoder circuit 124, both of which have inputs and outputs coupled to the bus 130. The bus 130 can be either an LPC bus or an ISA bus. The ISA bus decoder circuit 122 functions to decode the ISA bus signal, and the LPC bus decoder circuit 124 functions to decode the LPC bus signal. The ISA bus decoder circuit 122 and the LPC bus decoder circuit 124 can have the same structure and function as the decoder circuits 22 and 24, respectively, in FIG. 1. The micro-controller 134 of the device 120 has an output coupled to a switch circuit 132 (which can be the same as switch circuit 32 in FIG. 1 except that it receives a "select" signal), which has inputs and outputs coupled to the ISA bus decoder circuit 122 and the LPC bus decoder circuit 124. The switch circuit 132 functions to switch between one of the ISA bus decoder circuit 122 and the LPC bus decoder circuit 124. The micro-controller 134 outputs an LPC/ISA bus select signal, which can be pre-set or manually set or controlled by the user of the device 120.

In operation, when the computer system that includes the device 120 starts up, the micro-controller 134 of the device 120 provides the LPC/ISA bus select signal to the switch circuit 132 which indicates the status of the bus 130. The switch circuit 132 then enables either the ISA bus decoder circuit 122 or the LPC bus decoder circuit 124, by providing an ISA bus enable signal to the ISA bus decoder circuit 122, or an LPC bus enable signal to the LPC bus decoder circuit 124, depending on the nature of the LPC/ISA bus select signal received from the micro-controller 134. The enabled decoder circuit 122 or 124 will then decode the communication signals from the bus 130 using normal and well-known decoding methods for LPC and ISA communications, and provide the decoded signals via the switch circuit 132 to the other components of the peripheral device 120 for normal use and processing.

Figure 3:
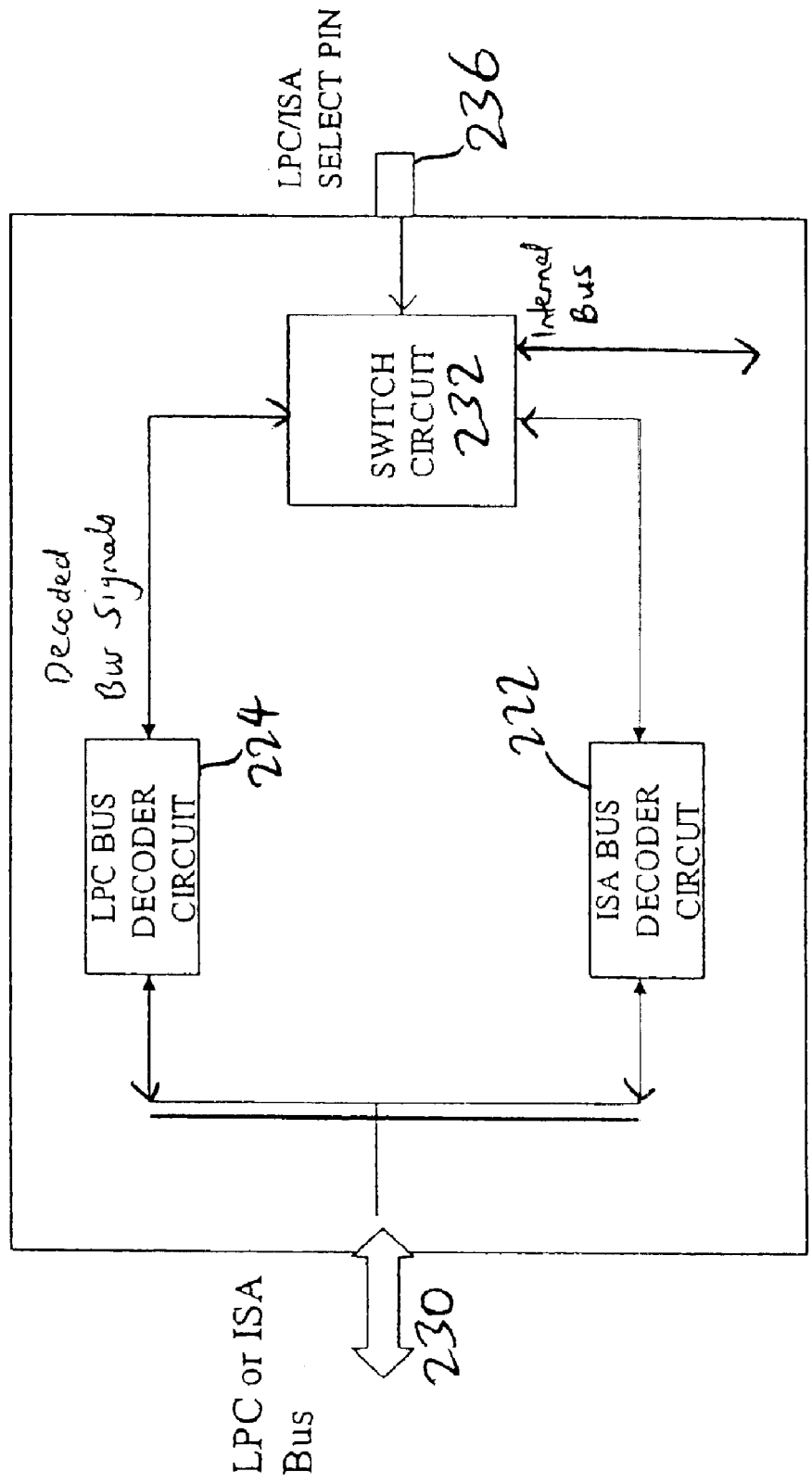
FIG. 3 is a very general schematic block diagram of a peripheral or memory device according to yet another embodiment of the present invention.

A third non-limiting embodiment of the present invention is illustrated in FIG. 3. FIG. 3 provides a high level schematic diagram that illustrates the primary hardware and software components of a pin based switching circuit that is provided in a peripheral device 220. The pin based switching circuit operates upon start up of the computer system by using a pin of the device 220 to switch communication with the host to the correct bus. The other components of a conventional peripheral device or memory device are not shown in FIG. 3, since they are well-known to those skilled in the art.

The pin based switching circuit in FIG. 3 has an ISA bus decoder circuit 222 and an LPC bus decoder circuit 224, both of which have inputs and outputs coupled to the bus 230. The bus 230 can be either an LPC bus or an ISA bus. The ISA bus decoder circuit 222 functions to decode the ISA bus signal, and the LPC bus decoder circuit 224 functions to decode the LPC bus signal. The ISA bus decoder circuit 222 and the LPC bus decoder circuit 224 can have the same structure and function as the decoder circuits 22 and 24, respectively, in FIG. 1. One pin 236 of the device 220 is coupled to a switch circuit 232 (which can be the same as switch circuit 32 of FIG. 1), which has inputs and outputs coupled to the ISA bus decoder circuit 222 and the LPC bus decoder circuit 224. The switch circuit 232 functions to switch between one of the ISA bus decoder circuit 222 and the LPC bus decoder circuit 224.

In operation, when the computer system that includes the device 220 starts up, an external signal that is coupled to the pin 236 provides an LPC/ISA bus select signal via the pin 236 to the switch circuit 232 which indicates the status of the bus 230. This external signal can be triggered by the user turning on or off a switch (which can be keyed, for example, into a keyboard or keypad) to control the processor (not shown) of the device 220 to generate the LPC/ISA bus select signal. The switch circuit 232 then enables either the ISA bus decoder circuit 222 or the LPC bus decoder circuit 224 depending on the nature of the LPC/ISA bus select signal received from the pin 236. The enabled decoder circuit 222 or 224 will then decode the communication signals from the bus 230 using normal and well-known decoding methods for LPC and ISA communications, and provide the decoded signals via the switch circuit 132 to the other components of the peripheral device 120 for normal use and processing.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A peripheral or memory device having a bus, and a bus switching circuit that comprises:

a first bus decoder circuit coupled to the bus for decoding signals in a first format;

a second bus decoder circuit coupled to the bus for decoding signals in a second format;

a first bus snoop circuit coupled to the bus;

a second bus snoop circuit coupled to the bus;

a switch coupled to the first bus snoop circuit for receiving a first bus detect signal therefrom, and the switch coupled to the second bus snoop circuit for receiving a second bus detect signal therefrom;

wherein the switch is coupled to the first bus decoder circuit for providing a first bus enable signal thereto, and the switch is coupled to the second bus decoder circuit for providing a second bus enable signal thereto, depending on the nature of the first and second detect signals;

wherein the first bus decoder circuit is an ISA bus decoder circuit, and the second bus decoder circuit is an LPC bus decoder circuit; and wherein the first and second bus snoop circuits generate the first and second bus detect signals, respectively, based on a series of I/O writes.

2. A peripheral or memory device comprising:

a bus;

a micro-controller which generates a bus select signal selected by the micro-controller without receiving bus data from the bus; and a bus switching circuit that comprises:
 a first bus decoder circuit coupled to the bus for decoding signals in a first format;
 a second bus decoder circuit coupled to the bus for decoding signals in a second format;
 a switch coupled to the micro-controller for receiving a bus select signal therefrom;

wherein the switch is coupled to the first bus decoder circuit for providing a first bus enable signal thereto, and the switch is coupled to the second bus decoder circuit for providing a second bus enable signal thereto, depending on the nature of the bus select signal; and wherein the first bus decoder circuit is an ISA bus decoder circuit and the second bus decoder circuit is an LPC bus decoder circuit.

* * * * *